United States Patent

Suzuki et al.

[11] Patent Number: 5,903,614
[45] Date of Patent: May 11, 1999

[54] COMMUNICATION METHOD AND RECEIVING APPARATUS

[75] Inventors: Mitsuhiro Suzuki, Chiba; Kazuyuki Sakoda, Tokyo, both of Japan

[73] Assignee: Sony Corporation, Tokyo, Japan

[21] Appl. No.: 08/998,386

[22] Filed: Dec. 24, 1997

[30] Foreign Application Priority Data

Dec. 26, 1996 [JP] Japan ..................... 8-384803

[51] Int. Cl.$^6$ ........................................ H03D 1/00
[52] U.S. Cl. ................ 375/340; 375/295; 375/308; 370/208; 370/210; 370/335
[58] Field of Search ................ 342/50, 88, 102, 342/357; 370/508, 515, 522; 375/200, 202, 208, 210, 340, 342–343

[56] References Cited

U.S. PATENT DOCUMENTS

| 3,742,498 | 6/1973 | Dunn | 343/7.5 |
| 4,041,391 | 8/1977 | Deerkoski | 325/30 |
| 4,481,640 | 11/1984 | Chow et al. | 375/200 |
| 5,541,552 | 7/1996 | Suzuki et al. | |
| 5,677,927 | 10/1997 | Fullerton et al. | 375/200 |
| 5,694,415 | 12/1997 | Suzuki et al. | |

*Primary Examiner*—Stephen Chin
*Assistant Examiner*—Joseph Roundtree
*Attorney, Agent, or Firm*—Jay H. Maioli

[57] ABSTRACT

A reception method of a multicarrier system is one in which a phase-modulated data is transmitted by using each of a plurality of subcarriers, and includes a random data generating step of generating a phase shift data randomly changed, a multiplying step for multiplying each of the received subcarriers with an output obtained in the random data generating step, and a state detection signal generating step for monitoring a state of an output obtained in the multiplying step and for generating a predetermined state detection signal when a predetermined state is detected.

8 Claims, 10 Drawing Sheets

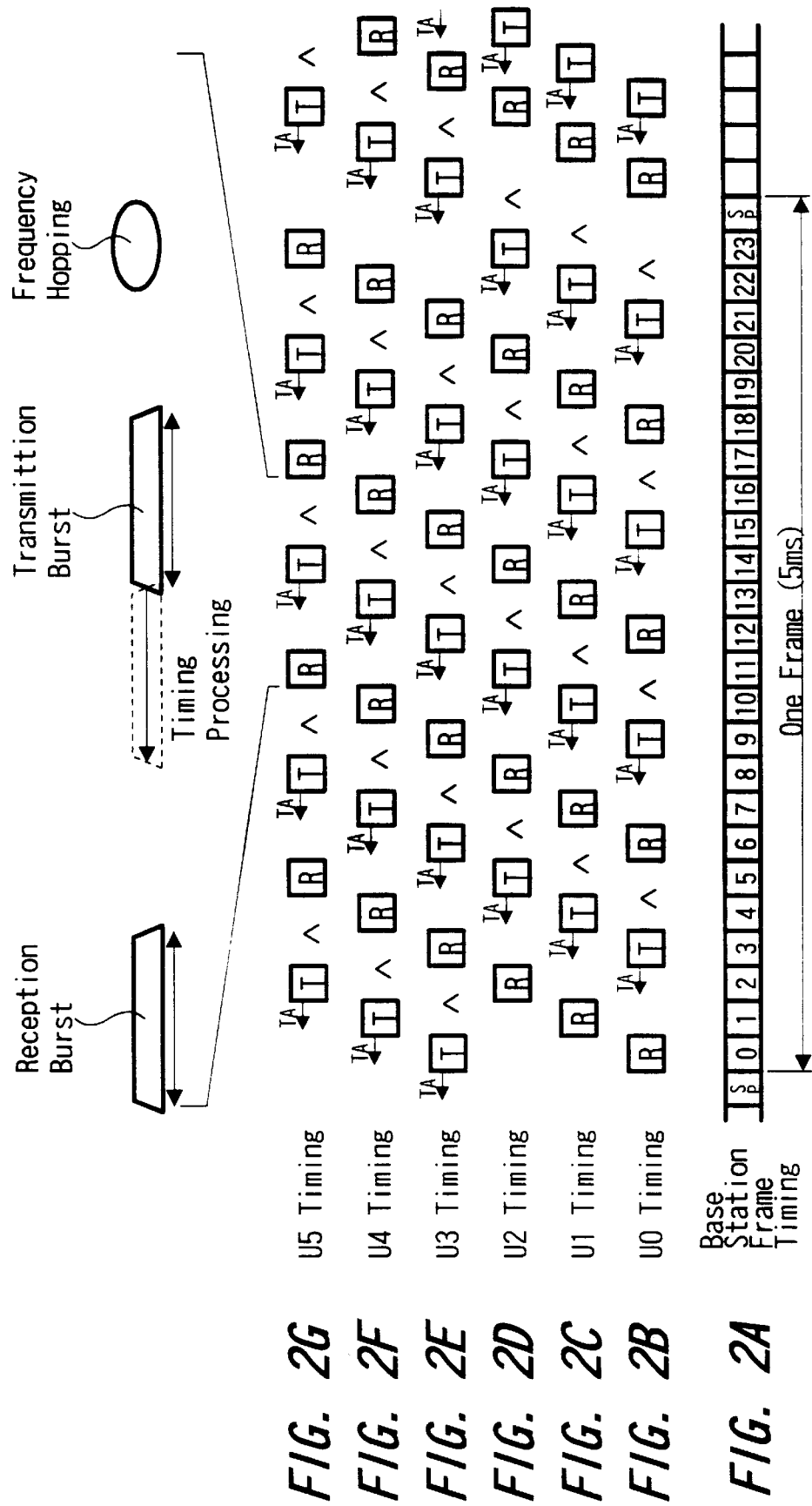

FIG. 6

| Number of Carriers | ... | 0 | 1 | 2 | 3 | 4 | 5 | ... | 20 | 21 | 22 |
|---|---|---|---|---|---|---|---|---|---|---|---|
| Phase Shift Value of Transmission Data | | | | | | | | | | | |
| Case 1 | ...... | 0 | $\frac{1}{4}\pi$ | $\frac{4}{7}\pi$ | $\frac{1}{3}\pi$ | $\frac{12}{13}\pi$ | $\frac{2}{7}\pi$ | | $\frac{4}{5}\pi$ | $\frac{7}{6}\pi$ | ...... |
| Case 2 | 0 | $\frac{1}{4}\pi$ | $\frac{4}{7}\pi$ | $\frac{1}{3}\pi$ | $\frac{12}{13}\pi$ | $\frac{2}{7}\pi$ | ...... | | $\frac{6}{7}\pi$ | ...... | ...... |
| Case 3 | ...... | 0 | $\frac{1}{4}\pi$ | $\frac{4}{7}\pi$ | $\frac{1}{3}\pi$ | $\frac{1}{3}\pi$ | $\frac{2}{7}\pi$ | | $\frac{4}{5}\pi$ | $\frac{6}{7}\pi$ | ...... |
| | | | 0 | $\frac{1}{4}\pi$ | $\frac{4}{7}\pi$ | $\frac{1}{3}\pi$ | $\frac{12}{13}\pi$ | | ...... | $\frac{4}{5}\pi$ | $\frac{6}{7}\pi$ |

COMMUNICATION METHOD AND RECEIVING APPARATUS

BACKGROUND OF THE INVENTION

1. Field of the Invention

The present invention relates to a communication method applicable to the orthogonal frequency division multiplex system (OFDM system) and a receiving apparatus for receiving a signal according to the communication method.

2. Description of the Related Art

For a communication method suitable for a mobile communication such as a wireless telephone system or the like, a multicarrier communication method called Orthogonal Frequency Division Multiplexing (OFDM system) has been proposed. This system is such that a plurality of subcarriers are arranged at a predetermined frequency interval within one transmission band and data is scattered over the respective subcarriers to modulate them for transmission. In this case, on a transmitting side, transmitting data in the form of a time sequence is orthogonal-transformed to a multicarrier signal at a predetermined frequency interval by a fast Fourier transform or the like. On a receiving side, a received multicarrier signal is subjected to the inverse transform of that in transmission for obtaining received data.

The transmitted signal according to the OFDM system has an advantage in that even if there is a multipath a good transmission characteristic is ensured, so that it is particularly suitable for the mobile communication such as the wireless telephone system or the like.

When such multicarrier signal is received, it is difficult to detect a frequency offset of the received signal. Specifically, when the multicarrier signal in which subcarriers of a predetermined number are provided in one transmission band, for example, is transmitted in a plurality of continuous transmission bands, it is difficult for the reception side to easily determine which range of the subcarriers from one transmission band. Especially, in order to increase the transmission efficiency, a frequency interval between the adjacent subcarriers is very narrow (e.g., an interval of several kHz) in the communication of this kind, which makes it difficult to precisely detect the frequency offset.

In order to solve this disadvantage, it can be considered that the transmission side transmits a specific symbol by using a subcarrier at a specific position in one transmission band and the reception side corrects an offset of a reception frequency with reference to the subcarrier in which the reception side receives the specific symbol. However, when such a specific symbol is transmitted, the period of data transmission is reduced to that extent, which reduces the transmission capacity.

SUMMARY OF THE INVENTION

In view of such aspects, it is an object of the present invention that, when transmitting the multicarrier signal, the frame period or a reference timing in a frame can simply be detected on a receiving side even if the synchronizing signal is not transmitted.

According to a first aspect of the present invention, a reception method of a multicarrier system, in which a phase-modulated data is transmitted by using each of a plurality of subcarriers, includes a random data generating step of generating phase shift data randomly changed, a multiplying step for multiplying each of received subcarriers with an output obtained in the random data generating step, and a state detection signal generating step for monitoring a state of an output obtained in the multiplying step and for generating a predetermined state detection signal when a predetermined state is detected.

According to a first aspect of the present invention, a reception apparatus for a multicarrier system in which a phase-modulated data is transmitted by using each of a plurality of subcarriers, includes a demodulation unit for demodulating a signal of a multicarrier system, a random data generating unit for generating phase shift data randomly changed, a multiplying unit for multiplying an output from the demodulation unit with an output from the random data generating unit, and a state detection signal generating unit for monitoring a state of an output from the multiplying unit and for generating a predetermined state detection signal when a predetermined state is detected.

BRIEF DESCRIPTION OF THE DRAWINGS

FIGS. 2A to 2G are explanatory diagrams showing the transmission timing according to the communication method applied to each embodiment of the present invention;

FIG. 6 is an explanatory diagram showing the phase shift states according to the first embodiment;

DESCRIPTION OF THE PREFERRED EMBODIMENTS

Embodiments according to the present invention will be described below with reference to the accompanying drawings.

In these embodiments, the present invention is applied to the wireless telephone system of what is called a cellular system in which a base station is arranged in a predetermined condition to form a service area and communicate with a portable station (terminal device). First of all, the multicarrier transmission system applied to the embodiments will be described in detail with reference to FIG. 1 to FIG. 4. A communication system of the present example is made to be the orthogonal frequency division multiplex system (OFDM system) in which a plurality of subcarriers are successively arranged within a preallocated band. And a plurality of the subcarriers within one transmission band are simultaneously utilized through one transmission path, and is further made to modulate collectively a plurality of the subcarriers within one band in a band division.

Figure 1:
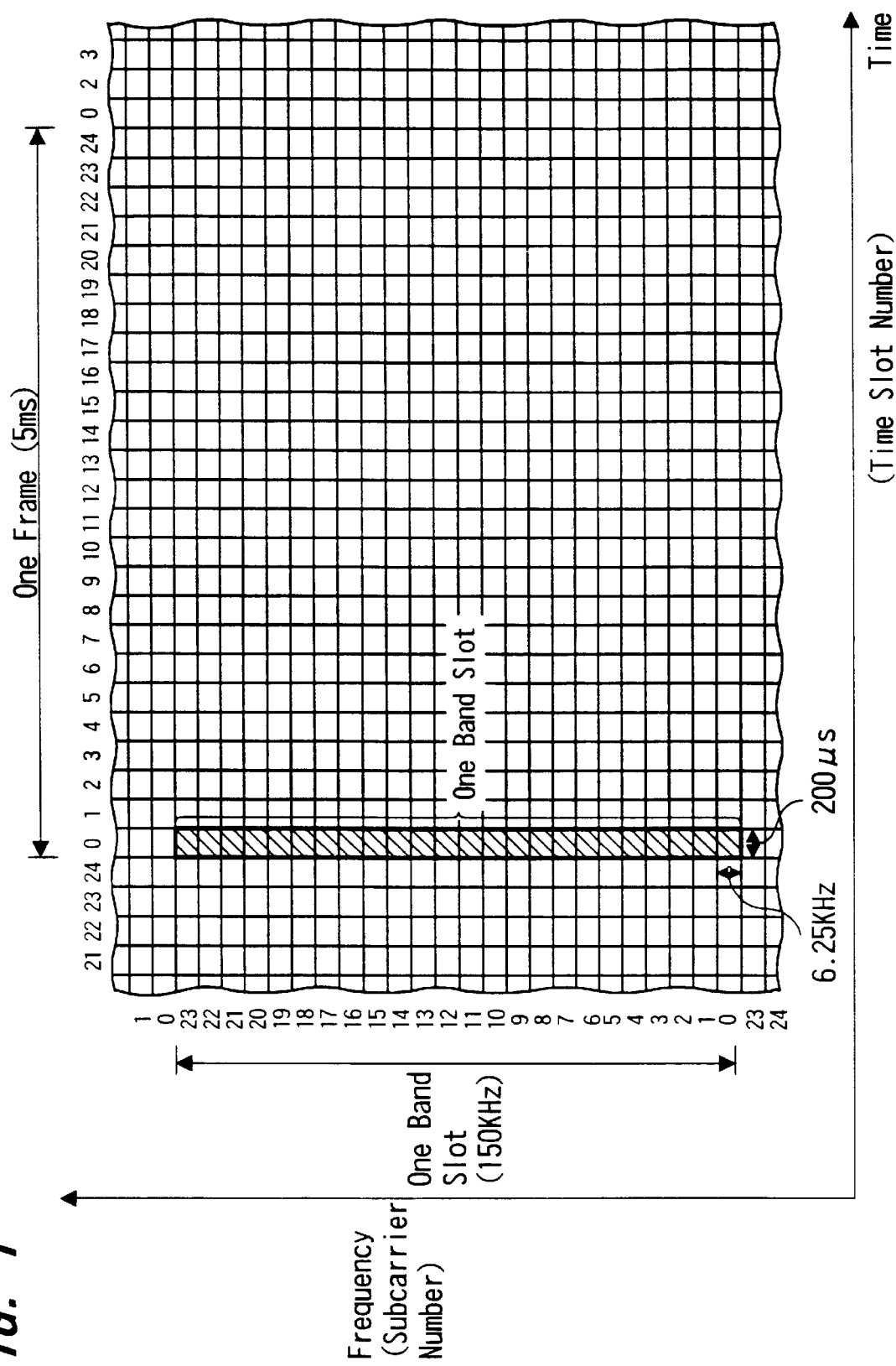
FIG. 1 is an explanatory diagram showing the structure of slots according to the communication method applied to each embodiment of the present invention.

A structure thereof will be explained. FIG. 1 shows how to construct slots of the transmitting signal in this example, in which figure a vertical axis represents frequency and a horizontal axis represents time. In case of this example, orthogonal bases are provided by dividing the frequency axis and the time axis in a grid shape. Particularly, one transmission band (one band slot) consists of 150 kHz and twenty-four subcarriers are arranged within this one transmission band of 150 kHz. These twenty-four subcarriers are successively arranged at an equal interval of 6.25 kHz and to each subcarriers are given subcarrier numbers 0 to 23, respectively. However, really existing subcarriers are twenty-two one from subcarriers numbers 1 to 22. Regarding the subcarrier numbers 0 and 23 at both ends within one band slot, they are made guard band in which no subcarrier is arranged and their powers are made zero.

Looking over the time axis, one time slot having a time period of 200 $\mu$s is defined and at every time slot the twenty-two subcarriers are modulated by a burst signal for transmission. A time section in which twenty-five time slots are arranged (i.e. 5 ms) is defined as one frame. To each time slot within this one frame is given time slot numbers 0 to 24, respectively. An area shown by hatching in FIG. 1 represents one time slot section of one band slot. Further, the time slot of the slot number 24 is made a time period where no data is transmitted.

Using the orthogonal bases formed by dividing the frequency axis and the time axis in a grid shape, the multiple access in which the cell station communicates simultaneously with a plurality of the portable stations (terminal devices) is carried out. In this case, as to a mode of coupling to each portable station, it is performed in such a manner as shown in FIGS. 2A to 2G. FIGS. 2A to 2G illustrate use of the time slots of six portable stations (users) U0, U1, U2, . . . U5 to be coupled to the cell station through one band slot (in practice, the band slot for use is switched by means of a frequency hopping described below), in which figure a time slot denoted by R is a receiving slot and denoted by T is a transmitting slot. The cell station establishes a frame timing of twenty-four time slot periods as shown in FIG. 2A (The last slot numbered 24 of twenty-five prepared time slots is not used.). In this case, the transmitting slot and the receiving slot are arranged here to use a different band transmission, respectively.

For example, the portable station U0 shown in FIG. 2B uses the time slots numbered 0, 6, 12, 18 within one frame as the receiving slot and uses the time slots numbered 3, 9, 15, 21 as the transmitting slot, through the respective time slots the reception or transmission of the burst signal being performed. The portable station U1 shown in FIG. 2C uses the time slots numbered 1, 7, 13, 19 within one frame as the receiving slot and uses the time slots numbered 4, 10, 16, 22 as the transmitting slot. Also, the portable station U2 shown in FIG. 2D uses the times slots numbered 2, 8, 14, 20 within one frame as the receiving slot and uses the time slots numbered 5, 11, 17, 23 as the transmitting slot. Again, the portable station U3 shown in FIG. 2E uses the time slots numbered 3, 9, 15, 21 within one frame as the receiving slot and uses the time slots numbered 0, 6, 12, 18 as the transmitting slot. Further, the portable station U4 shown in FIG. 2F uses the time slots numbered 4, 10, 16, 22 within one frame as the receiving slot and uses the time slots numbered 1, 7, 13, 22 as the transmitting slot. Finally, the portable station U5 shown in FIG. 2G uses the time slots numbered 5, 11, 16, 22 within one frame as the receiving slot and uses the time slots numbered 2, 8, 14, 20 as the transmitting slot.

According such as arrangement as is shown in FIGS. 2A to 2G, six TDMA (Time Division Multiple Access) in which the six portable stations are coupled to one band slot can be performed. Seeing from each portable station side, after the reception and transmission during one time slot period had been completed, there is a spare time for two time slot periods (i.e., 400 $\mu$s) until the next transmission or reception begins to be performed. Thus, using this spare time, a timing process and the process termed the frequency hopping are performed. That is, during about 200 $\mu$s before each transmitting slot T, a timing process TA in which a transmission timing is made to match with a timing of a signal from the base station side is performed. After a time passage of about 200 $\mu$s, when each transmitting slot T has been completed, the frequency hopping in which a band slot for the transmission and reception is switched over another band slot takes place.

A plurality of the band slots are assigned to one base station. For example, in case of the cellular system where one cell is comprised of one base station, if a band of 1.2 MHz is allocated to one cell, eight band slots can be assigned to one cell. Likewise, if a band of 2.4 MHz is allocated to one cell, sixteen band slots can be assigned to one cell. Also, if a band of 4.8 MHz is allocated to one cell, thirty-two band slots can be assigned to one cell. Finally, if a band of 9.6 MHz is allocated to one cell, sixty-four band slots can be assigned to one cell. In order to use equality a plurality of the band slots assigned to this one cell, the frequency switching process called frequency hopping is carried out.

Figures 3A, 3B:
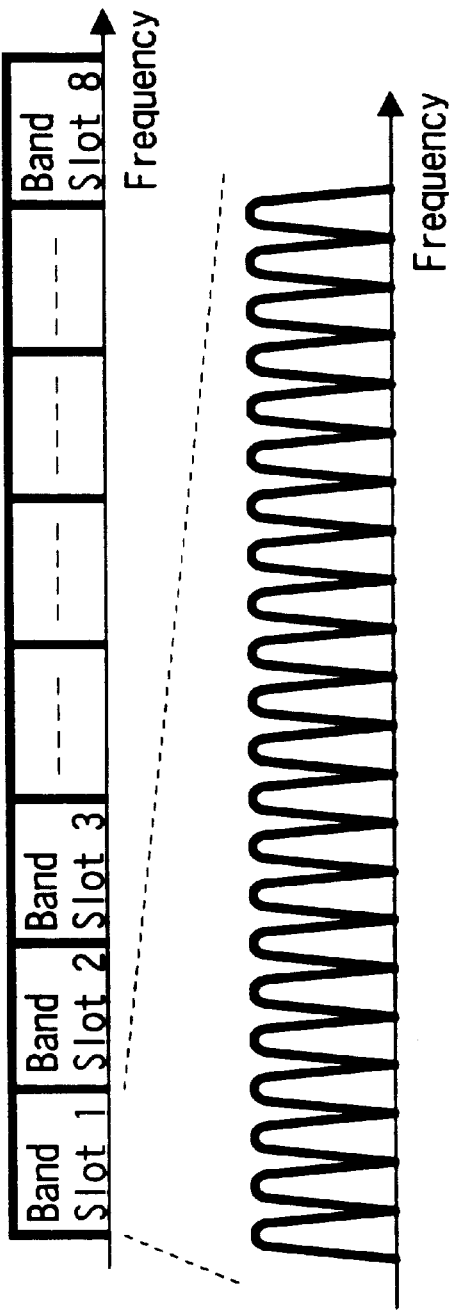
FIGS. 3A and 3B are explanatory diagrams showing the band slot according to the communication method applied to each embodiment of the present invention.
Figure 4:
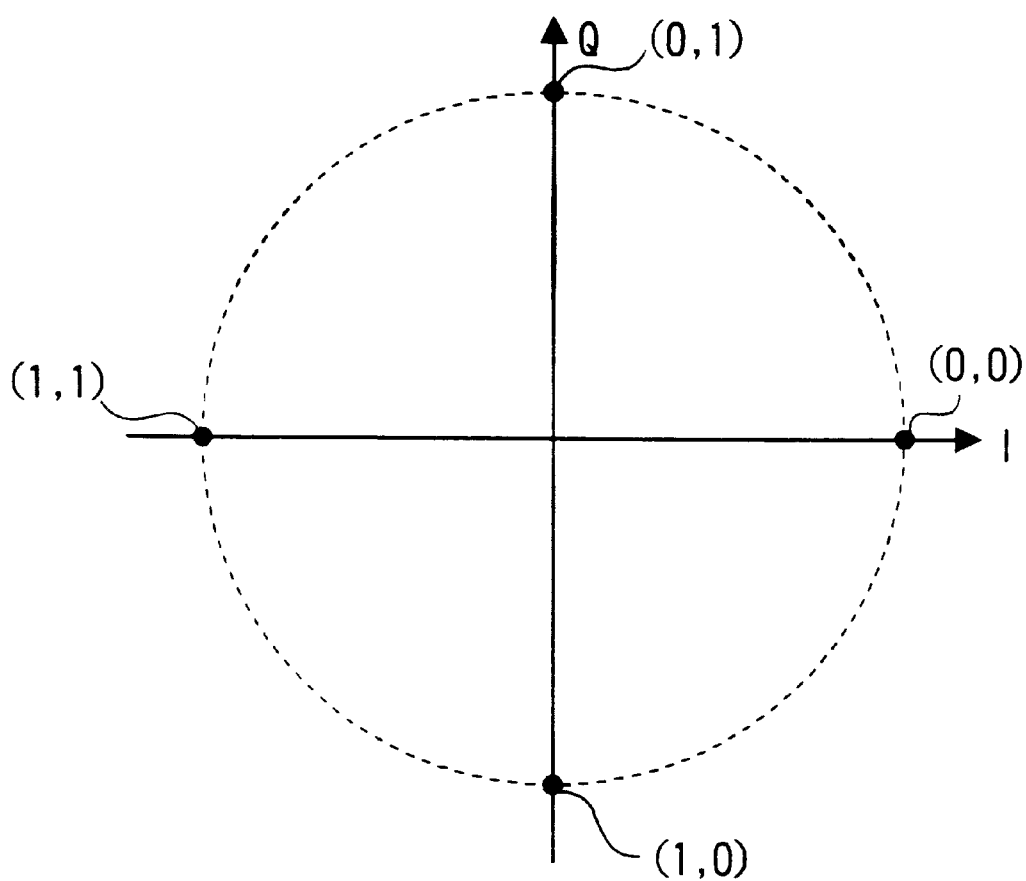
FIG. 4 is an explanatory diagram showing the transmission phase according to the communication method applied to each embodiment of the present invention.

FIGS. 3A and 3B show an example where eight band slots are arranged within one cell. At each of eight band slots prepared as shown in FIG. 3A, twenty-two subcarriers are arranged as shown in FIG. 3B for data transmission. Data is transmitted over each of the respective subcarriers under a predetermined phase modulation. In this example, QPSK (Quadrature Phase Shift Keying) modulation is used, in which data is transmitted as data at four points of phase position shifted in turn by $\pi/2$ of a circle on an orthogonal coordinate (a circle denoted by a broken line in FIG. 4) which are formed by laying an I component at right angles to a Q component, as is shown in FIG. 4.

Wireless communication takes place in this transmission system. However, in case of the present example, the transmitting signal is made of such data as each subcarrier is multiplied by respective different random phase shift data. That is, at each of the twenty-two subcarriers from the subcarrier number 1 to the subcarrier number 22 within one band slot, an initial phase shift value of the first data of the first time slot of each frame is established and then the phase shift value is changed from the initial phase shift value in a sequence determined at random sequence which is determined in advance).

Figure 5:
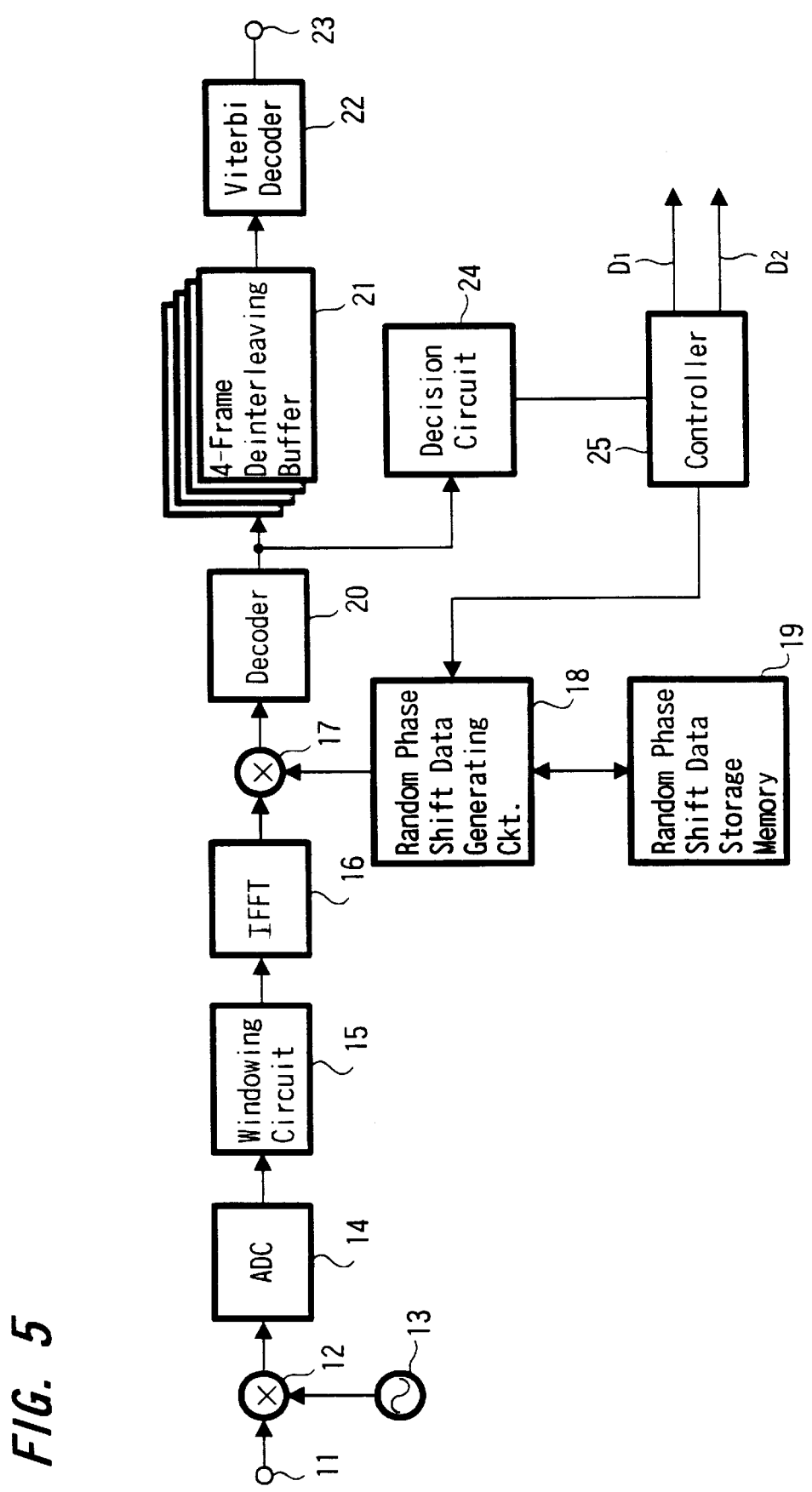
FIG. 5 is a block diagram showing the construction of the receiving system according to the first embodiment of the present invention.

Next, a construction of a first embodiment according to the present invention in which a terminal device (portable station) receives the signal transmitted from the base station in this way, will be described with reference to FIG. 5. FIG. 5 shows a receiving system of the terminal device, in which a received signal (the signal which is subjected to a receiving process in a filter or an amplifier after received by an antenna) available at an input terminal 11 is supplied to mixer 12, where it is mixed with a frequency signal output by a frequency signal generator means 13 comprised of a PLL circuit (phase locked loop circuit) for frequency converting the received signal of a predetermined transmission band (band slot) into an intermediate frequency signal. In this case, this frequency signal generator means 13 has basically an output frequency which varies at an interval of one band slot (i.e. here at a interval of 150 kHz).

Subsequently, the intermediate frequency signal output by the mixer 12 is supplied to an analogue/digital converter 14, where it is sampled at a predetermined sampling period. The received data sampled in the analogue/digital converter 14 is supplied to window multiplier circuit 15, wherein it is multiplied by window multiplying data (temporal wave form) corresponding to a window multiplying data by which it was multiplied on the transmitting side.

The received data multiplied by the window multiplying data is supplied to an inverse fast Fourier transform circuit (IFFT circuit) 16, wherein it is subjected to a transforming process between a frequency domain and time domain by the inverse fast Fourier transform operation, thereby causing the data which modulated the twenty-two subcarriers at an interval of 6.25 kHz for transmission to be a single sequence of continuous data in the time axis.

The received data transformed into a single sequence is supplied to a multiplier 17, wherein it is multiplied by random phase shift data output by a random phase shift data generator circuit 18. The random phase shift data output by the random phase shift data generator circuit 18 is generated on the basis of pattern data stored in a random phase shift pattern storing memory 19. The random phase shift data is data for restoring the data whose phase was shifted and scattered on every subcarrier in transmission from the transmitting side (base station) to the original data. As to the random phase shift data, an initial phase shift value to each subcarrier is determined and its value is arranged to change the phase to be shifted from the initial phase position at random (The order in which the phase shift amount is varied at random from the initial phase shift value is the same as that set up on the transmitting side). A timing to generate the random phase shift data by the generator circuit 18 is set up under the control of a controller 25 which controls the receiving operation of this terminal device.

Thereafter, the data whose phase has been restored to original phase is supplied to a decoder 20, where the phase modulated data is decoded by the differential demodulation or the like. The decoded data is supplied to a four frame deinterleave buffer 21, where interleaved data over four frames in transmission is restored to data of the original sequence. The deinterleaved data is supplied to a Viterbi decoder circuit 22 for Viterbi decoding. The Viterbi decoded data is then supplied as the received data to a received data processing circuit (not shown) at subsequent stage from a received data output terminal 23.

Moreover, in this embodiment, the decoded data by the decoder 20 is supplied to a decision circuit 24 which decides whether or not the data has correctly been decoded and supplies the decision data to the controller 25. Regarding this decision, for example, when accumulating phases of the signal over a time period in which data of the twenty-two subcarriers forming one band slot time period is acquired, if the accumulated phases vary at an angular interval of about $\pi/2$, the decision data is produced that indicates that the decoding has been completed correctly. If the accumulated phases do not vary at the angular interval of about $\pi/2$, the decision data is produced that indicates that it is erroneously processed data.

The controller 25 estimates, if it receives the decision data indicating that the decoding has been completed correctly, that there is no frequency offset in the received signal at that time. If it receives the decision data indicating that the decoding has been performed incorrectly, it estimates that there is a frequency offset in the received signal at that time. On the basis of a result of the decision, the controller 25 outputs the frequency offset correction data $D_1$ and makes a fine adjustment of a received frequency at intervals of 6.25 kHz.

The fine adjustment of the received frequency can be implemented by such processings as changing the output frequency of the frequency signal generator means 13 at an interval of 6.25 kHz, or as establishing the number of transform points in the inverse fast Fourier transform by IFFT circuit 16 more than the number of the subcarriers (twenty-two subcarriers) forming one band slot and then changing a position of the twenty-two subcarriers extracted from the transform points as a sequence of data or the like. Furthermore, the fine adjustment of the received frequency may be performed by other processing.

In addition, the controller 25 in the present embodiment outputs a frame position detecting data $D_2$ based on a timing when a predetermined condition has been decided by the decision circuit 24. On the basis of the frame position detecting data $D_2$, a processing timing at each of the circuits within the terminal device is set for the timing synchronous with the received data.

Next, an operation when receiving with the terminal device according to the present embodiment will be described. For example, when the base station transmits, the initial phase shift amount by which the first data of each frame is multiplied is made a value which is determined for every subcarrier and the phase shift amount for each subcarrier is arranged to change from the initial phase shift amount at a predetermined random manner.

Figure 7:
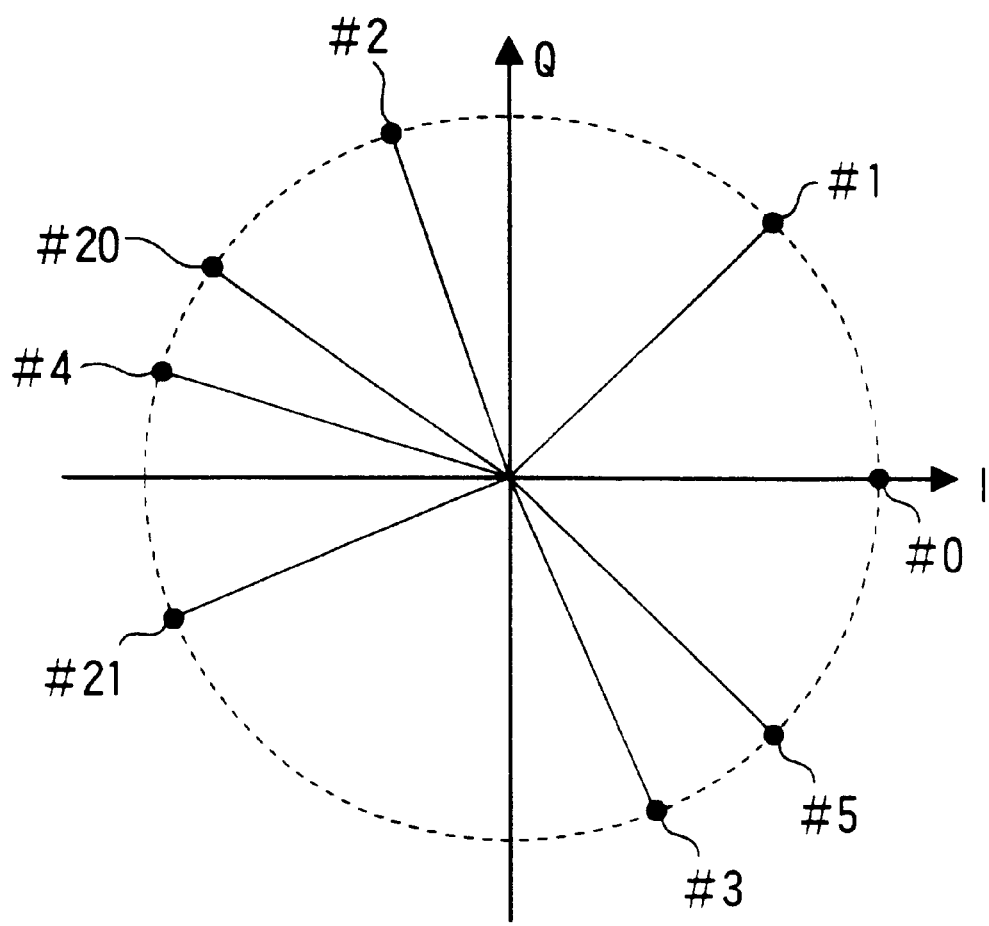
FIG. 7 is a phase characteristic diagram showing an example of the phase shift state according to the first embodiment.

FIG. 6 shows an example of the initial phase shift amounts of respective subcarriers. Phase shift value of transmitting data therein shows the initial phase shift amount of each of the subcarriers in each frame. Its value is determined in turn from the carrier number 0. These phase shift values are here set up within a range from $-\pi$ to $\pi$ so that all of them will be different phase shift amounts at respective subcarriers within one band slot. FIG. 7 is a diagram which shows the initial phase shift values of the respective carrier numbers by its phase state, in which figure the phases of the carrier numbers are represented as #0, #1, #2 and so on.

These initial phase shift values are also stored in the random phase shift pattern storing memory 19 of the receiving side (terminal device). On the basis of data read out of the memory 19, a processing to restore the phases of the subcarriers by the amount phase shifted by the multiplier 17 is performed. Case 1, case 2 and case 3 denoted in FIG. 6 show setting examples of the initial phase shift values by which the received signal is multiplied on the receiving side. In each case, the initial phase shift values are shifted in turn one by one subcarrier. Here, for example, the receiving process for the initial phase shift amount set up in each case is performed at every one frame. For example, in the first frame the initial phase shift amounts are set up according to case 1 and in the following frame the initial phase shift amounts are set up according to case 2 where they are shifted by one subcarrier. In the further following frame, the initial phase shift amounts are set up according to case 3 where they are shifted further by one subcarrier.

Figure 8A:
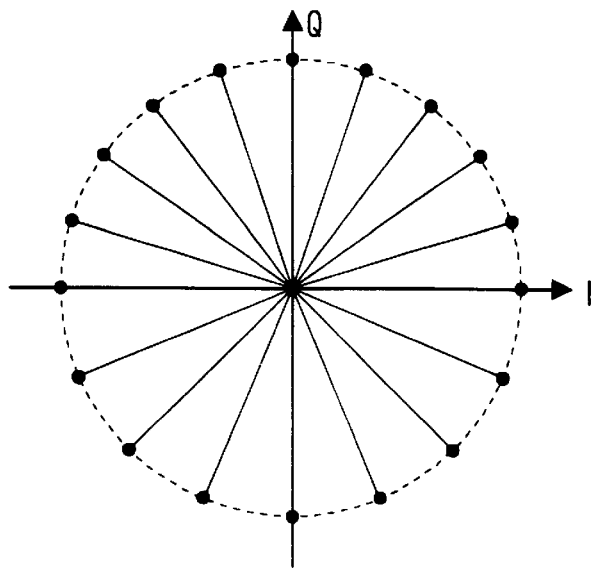
FIGS. 8A to 8C are characteristic diagram showing the phase state when assuming that data is zero with the first embodiment.
Figure 8B:
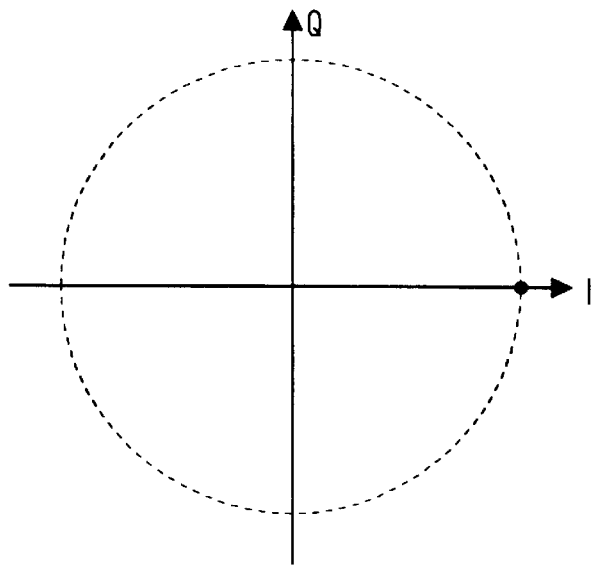
Figure 8C:
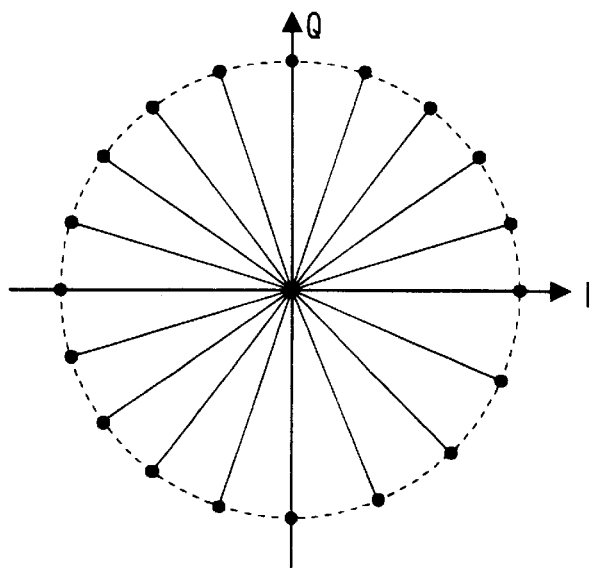

In the example of FIG. 6, since the initial phase shift amounts in case 2 correspond with those on the transmitting side, in a frame which sets up the initial phase shift amount according to case 2 for the receiving process, data can correctly be decoded and correct received symbol data can be obtained. That is, assuming that the transmitting data which is transmitted through the twenty-two subcarriers forming one band slot are the same data of all zero data, when the initial phase shift of case 1 is set up for the receiving process, the phase decoded by the decoder 20 will scatter into respective phase states as shown in FIG. 8A. Also, when the initial phase shift of case 3 is set up for the receiving process, the phase will scatter into different phase states as shown in FIG. 8C. In contrast to this, when the initial phase shift of case 2 is set up for the receiving process, the phase will go into the same phase state as shown in FIG. 8B. This means that the condition in which the receiving frequency is set up according to case 2 is the condition in which one band slot is correctly received and there is no frequency offset.

Figure 9A:
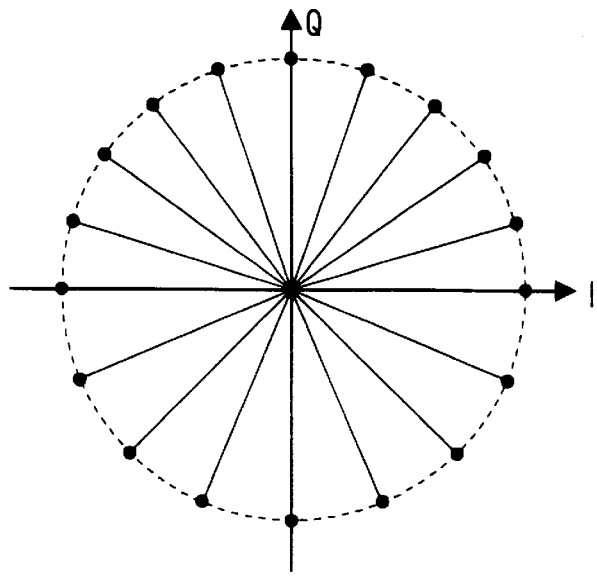
FIGS. 9A to 9C are characteristic diagrams showing the phase state when data is scattered with the first embodiment.
Figure 9B:
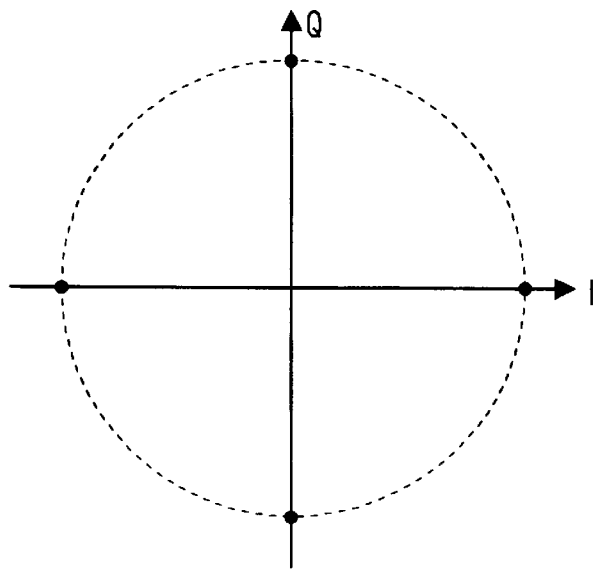
Figure 9C:
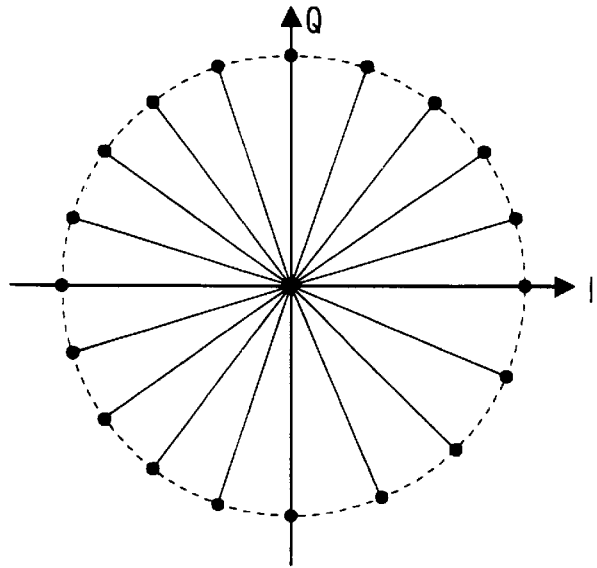

In fact, the transmitting data is scattered values and so the phase states corresponding to cases 1, 2 and 3 will change as shown in FIGS. 9A, 9B and 9C. When the accumulated phases in the decision circuit 24 correspond to case 2, it is decided that they change at an angular unit of about π/2 and the decision data indicating that the correct decoding has been performed is then supplied to the controller 25. In the receiving process corresponding to case 1 and case 3, since a change of the accumulated phases is not the change at an angular unit of about π/2, the decision data indicating that the data has been erroneously processed is supplied to the controller 25.

Therefore, the controller 25 outputs the frequency offset correction data D, and makes the initial phase shift to change in turn in order to control the receiving frequency to be set up correctly, until the state of case 2 is detected.

By performing a receiving process in such a manner as the present embodiment, when a multicarrier signal in which the subcarriers are successively arranged at a narrow frequency interval is to be received, it is possible to simply detect the correct receiving coverage of one band slot and to correct the frequency offset by a simple processing in a short period of time. In this case, since there is no need to transmit a particular symbol for detecting the frequency offset as in the past, the data transmission capacity for practical use increases by that less need, thereby allowing a correct receiving process to be performed without lowering the transmission efficiency.

Also, by performing the receiving process according to the present embodiment, it is possible to detect not only the frequency offset but also the frame position of the transmitting signal. Further, in this case, it is necessary for the random phase shift pattern to be determined beforehand so that a different pattern may be used depending on "the slot number in a frame given to the relevant slot. "If such an arrangement is made in advance, when, after the adjustment of the frequency offset has been completed, for example, "the random phase shift pattern used for the first slot in a frame" is produced by the random phase shift data generator means 18 and then the output of the decoder of received signal is multiplied by that random phase shift pattern, if it is decided that the phases of the respective subcarriers vary at an angular unit of about π/2, then it can be determined that the slot is the first slot in the frame. The timing of the frame can be detected by processing in this way.

In the above-mentioned processing, a slot signal in a certain slot is stored in a memory 31 and this signal is multiplied by the first shift pattern of the frame, by the second shift pattern of the frame, by the third shift pattern of the frame, etc. Thus, results of the multiplication by the respective shift patterns are decided, thereby also allowing the slot number in the frame given to the relevant slot to be estimated.

Figure 10:
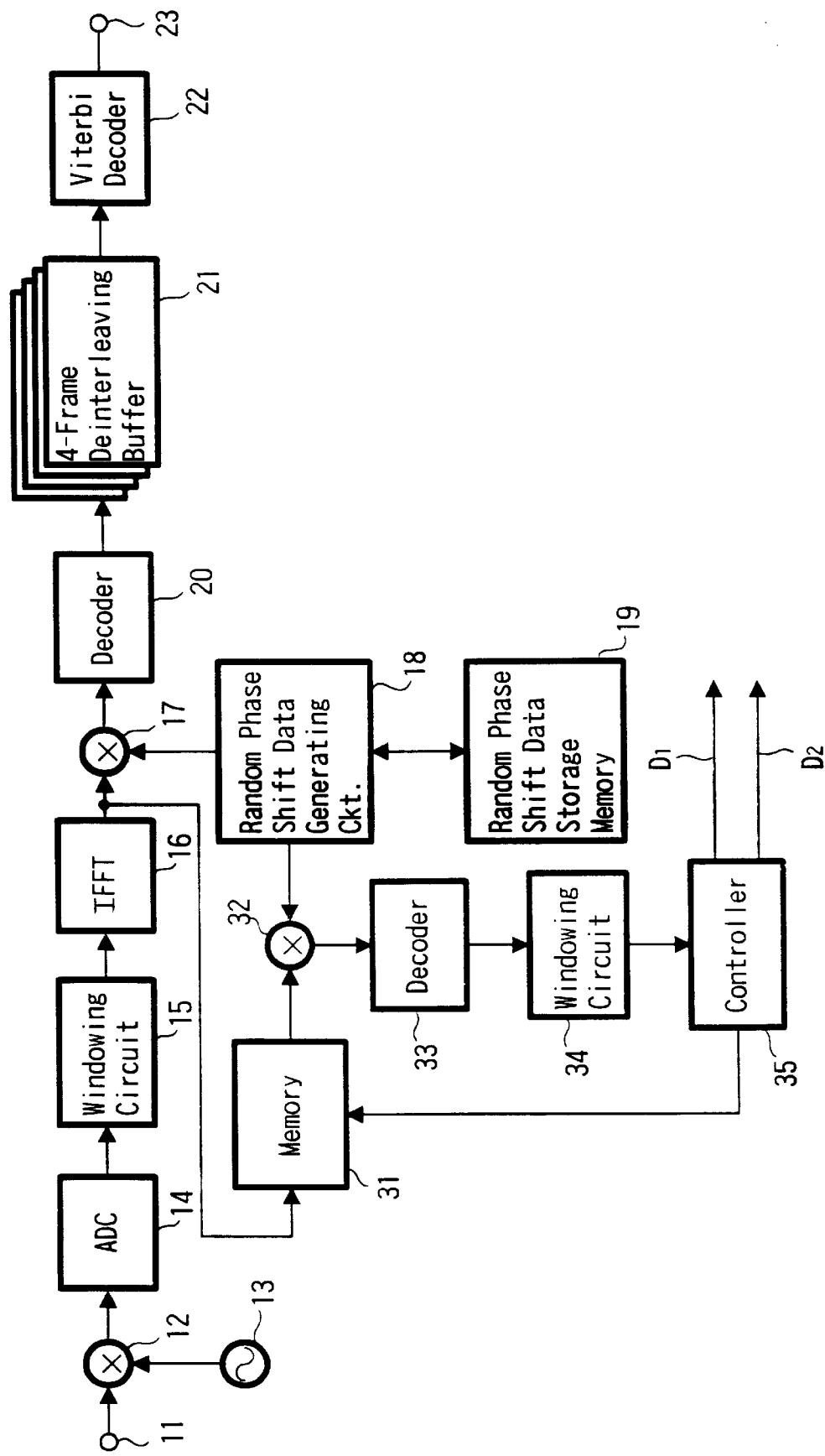
FIG. 10 is a block diagram showing the construction of the receiving system according to the second embodiment of the present invention.

Next, a second embodiment according to the present invention will be described with reference to FIG. 10. The construction shown in FIG. 10 is that of the receiving system in the terminal device for receiving the multicarrier signal according to the system described above referring to FIG. 1 to FIG. 3, in which the corresponding parts to FIG. 5 described on the first embodiment are denoted by the same reference numerals and are not described in detail.

In this embodiment, received data transformed by the inverse fast Fourier transform circuit (IFFT circuit) 16 is supplied to the multiplier 17 which multiplies the received data by the phase shift data output by the random phase shift data generator circuit 18. At the same time, the received data transformed by the IFFT circuit is supplied to a memory 31 and after it is once stored, it is supplied to a multiplier 32 which multiplies it by the phase shift data output from the random phase shift data generator circuit 18. At this time, a timing of outputting the phrase shift data from the random phase shift data generator circuit 18 to the multiplier 32 is made to synchronize with a timing of reading the received data out of the memory 31. Moreover, for the memory 31, a memory of a capacity which is capable of storing the received data for a predetermined time period (e.g. one frame period or one slot time period) is used. A timing of reading the data out of the memory 31 is controlled by a controller 35.

A multiplied output of the multiplier 32 is decoded by a decoder 33. This decoder 33 has the same structure as that of the decoder 20 which decodes the output of the multiplier 17. The data decoded by the decoder 33 is supplied to a decision circuit 34 which decides if the data is correctly decoded and its decision data is then supplied to the controller 35. Regarding this decision, for example, when accumulating phases of the signal over a time period in which data of the twenty-two subcarriers forming one band slot time period is acquired, if the accumulated phases vary at the angular of about π/2, the decision data is made what indicates that the decoding has been completed correctly. If the accumulated phases do not vary at the angular unit of about π/2, the decision data is produced that indicates that it is erroneously processed data.

The controller 35 estimates, if it receives the decision data indicating that the correct decoding has been completed, that there is no frequency offset in the received signal at that time. When the decision data indicating that the correct decoding can not be performed, it is decided that there is a frequency offset in the received data at that time. On the basis of a result of the decision, the controller 35 outputs the frequency offset correction data $D_1$ and makes a fine adjustment of a received frequency at an interval of 6.25 kHz.

Also, the controller 35 outputs a frame position detecting data D2 based on the timing when the predetermined state is decided in the decision circuit 24. On the basis of the frame position detecting data $D_2$, the timing of processing in each circuit of the terminal device is made to a timing synchronized with the received data.

Concerning other parts, they are constructed in the same way as those in the receiving system of the first embodiment shown in FIG. 5.

According to the construction of the second embodiment, by using the received data once stored in the memory 31, it is possible to perform processings for the received frequency offset detection and the frame position detection irrespective of the actual receiving condition. In other words, if the minimum unit of data required for detecting the frequency offset and the frame position is stored in the memory 31, it is possible that the stored data is repeatedly read out and at every readout time the initial phase shift amount is shifted in turn as case 1, 2 and 3 shown in FIG. 6, the result of decoding by the decoder 33 being decided in the decision circuit 34 for detecting the frequency offset and the frame position. Thus, using the received data stored in the memory 31, it is possible to quickly detect the frequency offset and the frame position.

Further, in the above embodiments, the processing where a signal transmitted from the cell station is received at the terminal device has been described, the present invention is of course applicable to a case where a signal transmitted from the terminal device is received at the cell station. In this case, the detected offset value is reported to the terminal apparatus with which the base station is communicating, and the terminal apparatus adjusts the frequency offset of a signal from itself in accordance with the report.

Moreover, in the above embodiments, the phase shift amount is set up at random within the range from $-\pi$ to $\pi$, whereas the phase shift amount may be set up at random within the other range. For example, it may be set up at random within the range from 0 to $\pi/2$.

Also, in each of the aforesaid embodiments, the present invention is applied to the multicarrier signal transmission system described referring to FIG. 1 to FIG. 4. However, the present invention is also applicable to a communication method and its receiving apparatus to which various transmission systems of other signals are applied. As to the specific modulating method and encoding method, they are not limited to those of the embodiments described above. In addition, regarding the mode of communication to be applied, it is applicable to the case where the multicarrier signal is transmitted in various wireless communications other than the wireless telephone system described above.

According to the communication method of the present invention, since an initial phase of each of subcarriers forming multicarrier signal is set to a predetermined random value, it is possible to precisely receive the transmitted multicarrier signal by detecting the random initial phase on the reception side.

Since the frequency offset between the transmission band and the reception band of the reception signal is detected by detecting an initial phase shift amount of each of subcarriers. It is possible to precisely correct the frequency offset.

When the phase change among the respective subcarriers of the received signal is in a predetermined state, it is determined that there is no frequency offset between the transmission band and the reception band of the reception signal. Therefore, it is possible to easily detect the frequency offset.

According to the reception apparatus of the present invention, since the frequency offset between the transmission band and the reception band of the reception signal is determined based on the phase change between the subcarriers determined by the determining means, it is possible to detect the frequency offset of the multicarrier signal with a simple arrangement.

In this case, the phase shift data based on the initial phase previously set for each of the subcarriers is multiplied with each of the subcarriers of the received signal, and the multiplied signal is decoded by the determining means. Then, it is determined whether or not the phase change falls in a predetermined state. Therefore, it is possible to easily determine whether or not the frequency is offset, only by determining the result of the decoding processing.

Since the multiplying means successively shifts the arrangement of the phase data to be multiplied with each of the subcarriers and a position where the determining means determines a predetermined state is determined, it is possible to easily detect a reception position with no frequency offset.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A reception method of a multicarrier system in which phase-modulated data is transmitted by using each of a plurality of subcarriers, comprising:

a receiving step for receiving the plurality of subcarriers that are transmitted;

a converting step for converting the received plurality of subcarriers to respective digital subcarriers;

a random data generating step for generating randomly changed phase shift data;

a multiplying step for multiplying each one of the plurality of digital subcarriers with an output obtained in said random data generating step;

a decoding step for decoding an output of the multiplying step;

a state decision signal generating step for monitoring a state of an output obtained in said decoding step and for generating a predetermined state decision signal when a predetermined state is detected; and a detecting step for detecting a frequency offset of each of said plurality of subcarriers based on an output obtained in said state decision signal generating step.

2. The reception method according to claim 1, wherein said predetermined state and said predetermined state decision signal are defined such that when an output obtained in said decoding step is changed by a unit of a predetermined value, it is regarded that there is no frequency offset and, in other cases, it is regarded that there is a frequency offset.

3. The reception method according to claim 1, wherein said predetermined value is $\pi/2$.

4. The reception method according to claim 1, comprising the further step of delaying each of said received subcarrier signals input in said multiplying step by a predetermined time.

5. A reception apparatus for a multicarrier system in which phase-modulated data is transmitted by using each of a plurality of subcarriers, comprising:

a demodulation unit for demodulating a received signal of the multicarrier system;

a random data generating unit for generating randomly changed phase shift data;

a multiplying unit for multiplying an output from said demodulation unit with an output from said random data generating unit and producing an output signal;

a decoder for decoding the output signal from said multiplying unit;

a state decision signal generating unit for monitoring a state of an output from said decoder and for generating a predetermined state decision signal when a predetermined state is detected; and a controller, wherein a frequency offset of the received signal is detected and corrected based on an output from said state decision signal generating unit.

6. The reception apparatus according to claim 5, wherein said predetermined state and said predetermined state decision signal are defined such that when an output obtained from said decoder is changed by a unit of a predetermined value, it is regarded that there is no frequency offset and, in other cases, it is regarded that there is a frequency offset.

7. The reception apparatus according to claim 6, wherein said predetermined value is $\pi/2$.

8. The reception apparatus according to claim 5, further comprising:

a signal delaying unit for delaying an output from said demodulation unit by a predetermined time and supplying the delayed output to said multiplying unit.

* * * * *